Aug. 27, 1940.  A. A LUND  2,212,544
PROCESS OF PREPARING CHOCOLATE
Filed Nov. 18, 1937   3 Sheets-Sheet 1

Inventor
Albert A. Lund
By R. P. Schulze
Attorney

Inventor
Albert A. Lund
By R. P. Schulze
Attorney

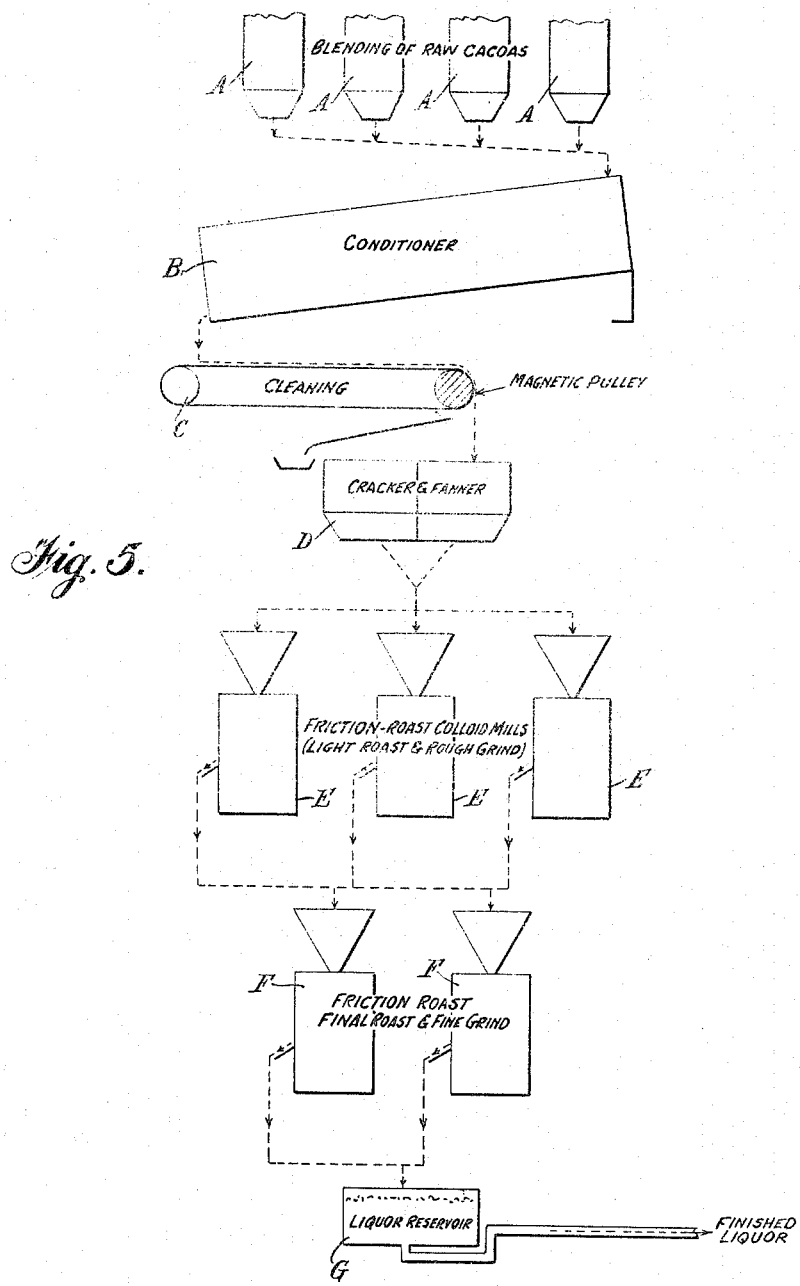

Patented Aug. 27, 1940

2,212,544

UNITED STATES PATENT OFFICE 2,212,544

PROCESS OF PREPARING CHOCOLATE

Albert A. Lund, Fort Washington, N. Y.

Application November 18, 1937, Serial No. 175,320

17 Claims. (Cl. 99—23)

This invention relates to improvements in processes for treating oleaginous materials requiring a grinding, roasting, heat treating, drying or refining treatment or combination of these treatments, and is particularly adapted for preparing and treating chocolate liquor from roasted or unroasted whole cacao beans or nibs. For the purpose of explaining the principles of the invention, the process is hereinafter described as applied to the preparation or treatment of chocolate liquor.

It is a primary object of the present invention to provide a process for the preparation of chocolate wherein the various conventional phases thereof are embodied in a single unitary and continuous process, or, more particularly, wherein the cacao beans or nibs may be subjected to simplified treatment wherein grinding, roasting, heat treating, drying and refining may be effected concurrently in a simple, effective and automatic manner.

It is a further object of the present invention to produce a chocolate liquor having novel characteristics which characteristics render the same superior in many respects to chocolate liquors heretofore conventionally produced.

The present invention is based principally on the novel concept of employing the frictional heat evolved during the grinding operation to effect roasting and/or heating of the cacao substance, as well as dehydrating and refining, or to effect any of these operations involving the use of heat either singly or collectively in conjunction with the grinding operation.

Other objects and advantages of the invention include a great economy in the cost of preparing chocolate liquor which is effected by the use of simplified and comparatively inexpensive equipment; a minimum expense for upkeep and repair of such equipment; a reduced time cycle over processes heretofore employed; the elimination of a very large proportion of the labor necessary in prior processes with the resulting elimination of human error and the production of a more uniform product; a reduction in fuel and power costs; and many other advantages as will be apparent from the following detailed description.

Prior processes for preparing chocolate have required the use of extensive equipment of a bulky nature, such as, a suitable means for roasting the cacao beans, a separate device for grinding the roasted material, preferably in a plurality of stages, suitable apparatus for effecting the conventional refining and finishing operations together with means for handling the material between these various operations. The present invention embodies all or any of these various stages of treatment of the cacao substance in conjunction with the necessary grinding operations in a single step, unitary process which requires compact equipment of an extremely simple nature.

The practice of the present invention is not limited to the use of any specific equipment or apparatus, but for the purpose of illustrating the principles of the invention, reference is had to the accompanying drawings wherein apparatus of a character suitable for the successful practice of the process of the invention has been illustrated.

In the drawings Fig. 1 is a side elevational view partly broken away of a device adapted for the preparation of chocolate in accordance with the principles of the present invention.

Fig. 5 is a diagrammatical flow chart of a suggested coordination of the process in large scale commercial production.

Figure 1:
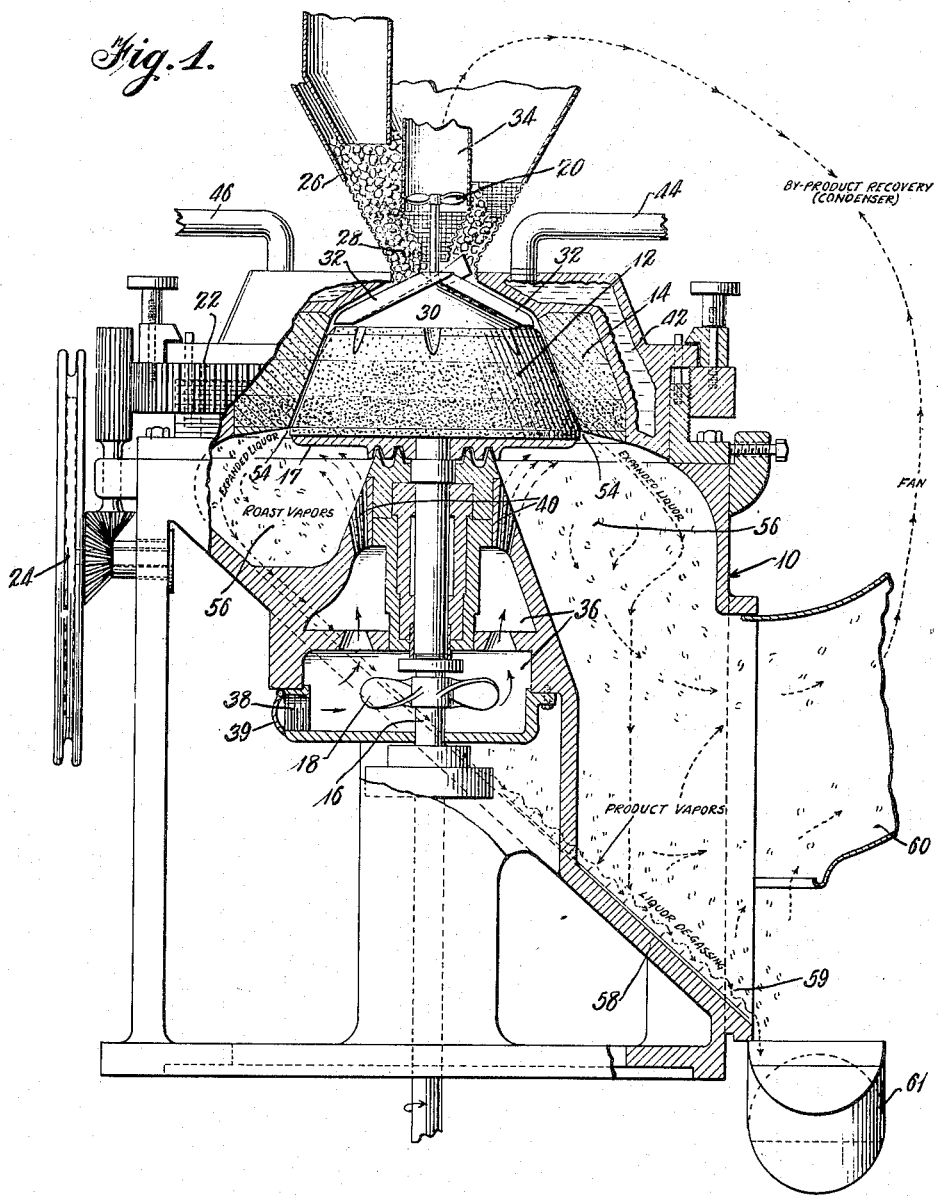

Referring more particularly to the drawings wherein like numerals refer to like parts, in the device illustrated in Fig. 1, 10 represents a chamber of any suitable character housing therein a frictional grinding arrangement represented generally by the rotor 12 and the stator, or collar, 14. Concentric with the rotor and preferably driven from the bottom of the housing 10 is a drive shaft 16 which drives the rotor 12 within the stator 14 at a predetermined high speed and which preferably carries fans illustrated at 18 and 20 in any suitable number and arrangement to effect desired circulation.

The rotor 12 and stator 14 are formed of bonded, heat-resisting abrasive material such as silicon carbide grits bonded by porcelain, and may be of uniform composition throughout or disposed in successive layers of decreasing grit sizes.

The stator 14 may be vertically adjusted with respect to the rotor 12 by means of a geared micrometer ring indicated generally at 22 which is operated by a vernier adjustment wheel 24 in order to provide the desired clearance between grinding faces of the stator and rotor. In addition, means may be provided for horizontal adjustment of the stator and rotor so as to permit the grinding surfaces to be kept equidistant at all points of the periphery.

Disposed above the rotor 12 and preferably concentric therewith is a hopper 26 for feeding the cacao substances to be treated to the grinding surfaces. Hopper 26 may be, as illustrated in Fig. 1, formed of reticulated material for the purpose of air cooling and ventilating the solid nibs fed therethrough, but it is apparent that such material is not suitable for feeding substances in a liquid phase in which event a solid walled hopper may be employed. The mouth or outlet 28 of the hopper 26 is contracted to provide a feeding inlet of restricted area whereby the ceiling of the head may be closed over for the greater portion of its area.

Disposed beneath the hopper mouth 28 and carried axially by the rotor 12 is a cone 30 upon which is mounted a plurality of inclined impeller blades 32, the upper extremities of which engage the incoming material and urge the same in a spiral direction downward of the cone and into the area between the grinding surfaces during which time the material may be subjected to dehydration by the frictional heat developed as the result of grinding previously fed material.

Means may be provided for exhausting steam resulting from the dehydration of the nibs in contact with the cone 30 and, in the apparatus illustrated, a flue 34 is disposed within the hopper 26 through which such steam may be continuously expelled and recondensation upon the nib substance avoided. The fan 20 which is adapted to rotate with the cone 30 provides a forced draft.

Figures 2, 3:
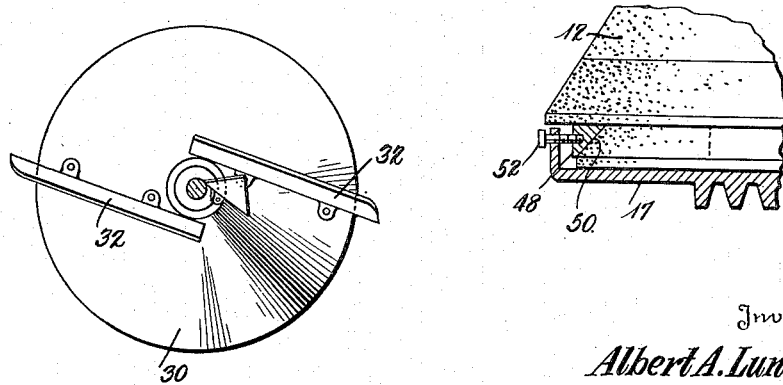
Fig. 2 is a plan view of the conical feeding assembly mounted above the rotor in Fig. 1.
Fig. 3 is an enlarged fragment of Fig. 1 illustrating a preferred manner of mounting and driving the rotor.

Disposed beneath the rotor 12 is a chamber 36 which is continuously supplied with air or other gas through a suitable port indicated generally at 38 and which is apertured at 40 to direct such air or gas to the vicinity of the material emerging from the grinding faces. Suitable valve means indicated at 39 may be provided for regulating the volume of air or gas admitted through the port 38. A water jacket 42 having an inlet 44 and an outlet 46 may be provided for the purpose of regulating the temperature of the head of the device. The head of the apparatus is constructed so as to be removable to provide convenient access to the interior of the mill and the rotor 12 may be detachable from its drive shaft 16 and supporting plate 17 for replacement or substitution by means as best exemplified in Fig. 3, such as a contracting spring steel split ring 48 which engages a groove 50 provided in the base of the rotor and is secured to the plate 17 for driving connection therewith by means of set screws or the like 52.

In employing the apparatus herein illustrated and above described in the practice of the process of the present invention, the rotor 12 is driven at a relatively high rate of speed, as for example 3600 to 5400 R. P. M., with a relatively narrow clearance between the grinding surfaces of the rotor 12 and stator 14, as for example 0.0005 to 0.005 inch. The cacao substance in the hopper 26 to be fed to the system, and which may, if desired, have been subjected to any suitable preliminary treatment, is forced downwardly of the cone 30 by the impellers 32 to the leading edge of the rotor, and thence into the working passage between the rotor and stator wherein it is subjected to the grinding operation. Frictional heat evolved as the result of the grinding operation is captured and employed in the process as herein more fully explained. The thus ground cacao substance emerges from the grinding passage at 54 in a thin film into a treating chamber 56 wherein it may be subjected to cooling by and absorption of air, carbon dioxide, ammonia or mixtures thereof admitted through the port 38. The milled and heated film of liquid material may be permitted to absorb atmospheric oxygen in the chamber 56 to roast same or in a like manner, the material may be permitted to absorb air and ammonia to provide roasting and alkalinization or the roasting action may be repressed by permitting carbon dioxide to be absorbed at this point.

The ground material thus treated in whichever manner desired falls by gravity to the inclined spillway 58 whence it flows from the mill by gravity. Vapors and gases evolved from the liquor in the chamber 56 and on the spillway 58 may be withdrawn through a suitable flue to a by-product recovery condenser. The degassing of the liquor may be facilitated by providing a plurality of baffle plates 59 on the spillway 58 or by any other suitable means or the liquor may be led from the spillway to a tank 61 in which the gases are permitted to rise while the degassed material is continuously removed from the bottom of the tank 61.

Figure 4:
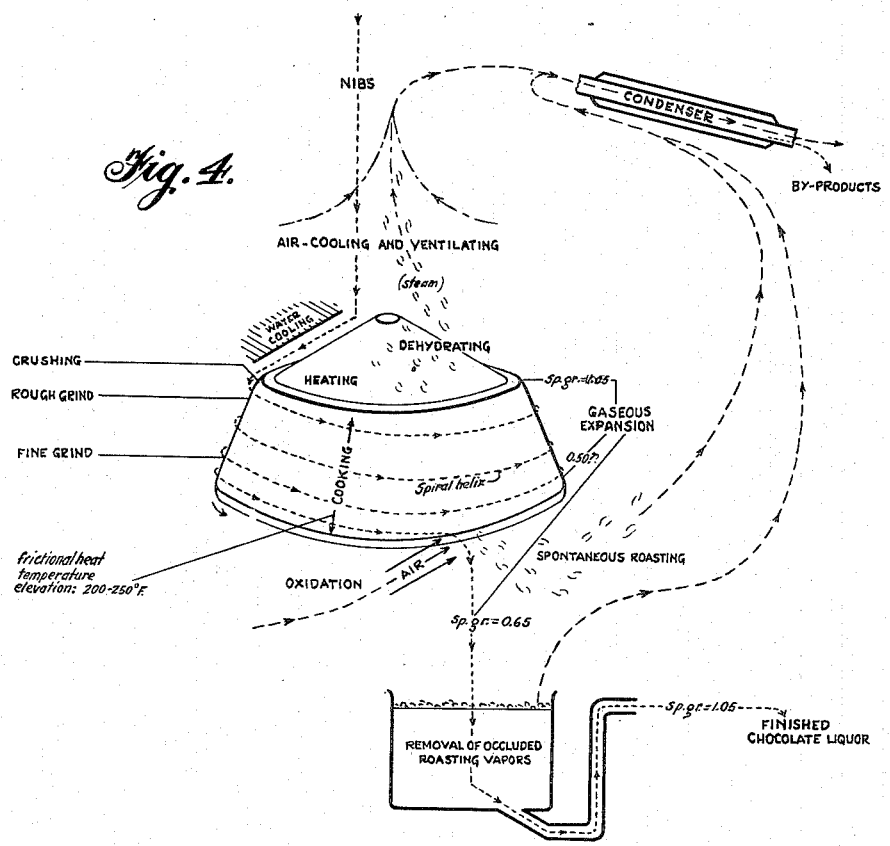
Fig. 4 is a diagrammatical view of portions of the apparatus of Fig. 1 and bearing legends to illustrate the manner in which the various stages of treatment are effected.

The diagram of Fig. 4 illustrates with clarity the various treating stages and the physical and chemical alterations of the material in such stages during subjection of the cacao nibs to the process of the present invention. As shown therein the nibs fed to the mill are subjected to a dehydrating action by the heat which has accumulated in the head of the mill as the result of frictional heat development. The moisture content of the incoming substance which is in excess of approximately one and one-half to two percent is liberated in the head of the mill and is exhausted from the mill. The remaining moisture is liberated at the point of exit of the material in the chamber 56. The liberation of the excess moisture in the head of the mill reduces the adhesiveness of the material so that when the contained cacao fat is released from the cells of the cacao substance by the initial grinding action the resulting lubrication of the surfaces prevents the solid substance from being gripped so positively by the stones as to be immediately ejected from the working passage by centrifugal action. Instead, the cacao substance is induced to take a relatively long spiral helical course in its travel through the working passage which greatly increases the amount of grinding performed between the stones. The absorption of heat units developed by friction causes the volatile matters of the cacao to assume the gaseous state so that the liquor becomes expanded and its specific gravity greatly reduced. The reduction of the specific gravity of the cacao liquor results in a diminished effect of the centrifugal force upon the liquor so that the coils of the travel-helix gradually contract as the material proceeds in its downward path between the stones. The normal specific gravity of cacao nibs is 1.05 to 1.08. The specific gravity of the expanded liquor as it emerges from the working passage may be from 0.65 to 0.90, indicating a specific gravity of the material while in the working passage of 0.50 or less before the roasting and/or refining vapors have passed off. After the degassing operation, previously described, the cacao liquor may be permitted to return to a specific gravity of approximately 1.05 to 1.08 which is the normal specific gravity for cacao liquor.

The grinding action as contemplated by the invention preferably involves impact, abrasion and shear. The initial state of grinding consists chiefly of a crushing action to release the contained fat to serve as a lubricant in the succeeding stages of treatment. For this purpose the uppermost layer of the grinding stones is preferably composed of a relatively coarse grit, for example, grits of 20 to 30 mesh. In the intermediate stage of grinding grit sizes of 40 to 60 mesh are preferably employed in order to increase the grinding action. In the final stage of grinding grit sizes of 80 to 120 mesh may be used. A single grit composition of, let us say, 40 to 60 grits may be employed for the entire process, but I have found that finer grits than this permit particles of cacao shell to "feather through" without being ground.

The frictional heat developed, approximately 200 to 250 degrees F., when added to the initial temperature of the material subjected to treatment, in conjunction with the delayed passage of the material through the grinding passage during which time it is subjected to this temperature, and, abetted by the fact that the heat is applied to the film of the material being treated at the colloidal interface make it possible to effect refining, developing and finishing of the material concurrently with the grinding or milling. The process may be adjusted to reduce the time required for the material to enter and leave the friction surfaces to a mere fraction of a second, but by prolonging this time to, perhaps, several seconds or more, developing and finishing, which operations normally require a very considerable amount of time, may be effected spontaneously with the grinding operation.

Because the roasting or other gas treatment of the cacao substance takes place after emergence of the liquor from the grinding passage the milling or grinding action may be controlled independently of the roast. During roasting, oxygen is absorbed by the dispersed heated liquor film in such manner that the scorching and overroasting of conventional processing are prevented. The heated film possesses no capacity to absorb the oxygen until it is in the process of being cooled by it. This cooling action provides an automatic check on overroasting, and by tempering the oxygen admitted to the roasting chamber, this action may be further controlled. Also, by closing the chamber and admitting regulated volumes of air or of inert gas or mixtures thereof any desired amount of roast may be obtained from a complete nonroast to a full roast under definitely regulated conditions.

The degree of grinding accomplished by the process may be regulated by any or all of a variety of means. The greater the speed of rotation the shorter the grinding path and the less grinding performed. I have found a desirable range of rotor speed to be from 3400 to 5400 R. P. M. for rotors having base diameters of from 4½ to 8½ inches.

The closer the grinding surfaces are brought together, generally speaking, the finer the grind resulting. However, excessively close clearance adjustments may result in an excessive heat development in the film with consequent reduction of viscosity of the film and a diminished grinding action. The proper clearance for a given quality of material may be determined empirically or by reference to its fat, crude fibre and moisture contents.

The grinding action is, of course, substantially influenced by the coarseness of the abrasive composition comprising the grinding surfaces and while, generally speaking, the finer the size of the grits employed in the stones the finer the grind resulting, a point is reached at which increasing grit fineness results in diminished grinding. I have found that the employment of successive layers of coarse, medium and fine grits gives a most desirable result, although it is possible to employ single layer coarse and fine grit compositions in a plurality of stages to effect the same result.

The denseness or relative porosity of the abrasive composition likewise influences the amount of grinding performed in a given traverse over the stones. Increased grinding is also facilitated by the partial removal of moisture from the cacao nib in the head of the mill prior to its introduction to the working passage. This is because free moisture tends to emulsify the fat of the cacao, rendering it unavailable for lubrication of the grinding surfaces and providing instead, an adhesive substance which the abrasive surfaces grip more readily and instantly eject from the working passage in an almost direct trajectory. I have found that best results are obtained when the moisture content of the nibs is reduced to one and one-half to two per cent or less at some point before the material is permitted to enter the grinding passage.

Other adjustable factors influencing the grinding action are the depth of the working passage (I employ preferably stones having a depth of not less than two inches measured along the grinding face) and the angle of the inclination of the grinding passage with respect to the axis of rotation. I have discovered that best results are obtained with rotor stones of 5 to 8½ inch base diameter when the angle of inclination is less than 30 degrees and more than 0 degrees and preferably about 20 to 22½ degrees. By regulating these various factors I have found it easier to obtain in one step of grinding perfectly smooth, fully finished liquors which upon extraction with a fat solvent leave less than 0.2 per cent of residue on a screen of 150 mesh.

While the temperature which may be developed in the liquor film undergoing treatment is an obvious concomitant of the degree of grinding performed upon the film, I have found that I may regulate this to some extent independently of the grind, using one or more of a variety of means.

First, by water-jacketing the head of the mill I may alter the rate of heat-transfer from the stator grinding surface. I may cool the rotor by other suitable means such as to cause a stream of cool air to be directed upwards against the rotor. I may ventilate the head of the mill by means of a reticulated cone assembly mounted above the rotor and by means of the reticulated hoppers shown in Figure 1. Likewise, I may precool the material admitted to the process. I have established that a desirable temperature range for this process is from about 250 degrees to 285 degrees F. although higher or lower temperatures may be obtained if desired.

The product of the process of my invention may be undistinguishable from chocolate liquor conventionally prepared, or the process may be so regulated as to produce a chocolate liquor which is altered in composition and properties in a number of desirable ways. Thus, for example, I may regulate temperatures, air volume, etc., so that the liquor is literally "air-blown," the result in the composition of the liquor being a diminished ratio of unsaturated to saturated fatty acids, reflected analytically in an abnormally low Iodine No. of the fat. Such liquor possesses an increased resistance to fat bloom when incorporated in a chocolate coating and may also be made to influence the preparation of such coatings in other desirable ways. The freshly-made product may be permitted to retain a portion if its occluded vapors by cooling the liquor before the gases have fully escaped. In this manner I may prepare an "expanded" sponge-like chocolate of substantially increased bulk, and with a definitely altered texture and eating quality. Further, I may prepare a liquor for cacao butter pressing in which the contained fat is centrifugally expressed from the colloidally disrupted cells of the cacao substance and thus rendered easier of removal in the pressing operation and in materially increased yields. The liquor may be made lighter in color by varying the amount of occluded gas allowed to remain therein. I may, further, cause the protein and natural sugar contents of the cacao to react forming caramel-like substances which are not true caramels but amino-sugar complexes which impart a desirable nut-like flavor to the chocolate and thereby provide a pre-treated liquor for the manufacture of so-called "fondant chocolate" without further special processing to produce the aforesaid "fondant" character. I may of course render a normally acrid or acid-tasting nib or liquor mild and palatable to the taste and thus enable cheaper varieties of beans to replace the more expensive varieties.

The by-products of my process likewise possess an improved quality and increased utility. The roasting vapors resulting from the practice of my invention contain free fatty acids and other valuable substances which may be readily precipitated by passing the vapors through a condenser. These substances are more readily recoverable and separable because they are uncontaminated by pyroligneous acid or other unproducts of destructive distillation such as almost invariably occur in the roasting smokes of the conventional processing.

The shell substance which is removed from the dried unroasted cacao beans contains substantially less fat and consequently need not be subjected to an extraction process to recover same. The fat is retained with the nib substance, there being little or no "blotter-effect," or absorption of the fat into the shell when the beans are unroasted.

The nutrient value of the shell as fodder is enhanced because the process avoids contamination by products of combustion and permits the shell to retain such vitamins, enzymes, etc. as it normally possesses in the raw state.

The flow diagram of Fig. 5 represents a suggested complete system for large scale commercial production according to the process of the invention. Provision herein is made as in A for first producing the desired blend of raw cacaos and thence passing the blended cacao beans to a conditioner wherein they are treated to facilitate removal of the shell.

Cleaning at C may be effected if desired before the conditioning treatment or thereafter as illustrated. From the cracker and fanner D the cacao nibs are fed to a battery of mills wherein the nibs are milled or ground and wherein the actions or rough grinding and a part of the roast may be performed in one stage E and thence the liquor is led to a subsequent stage F wherein fine grinding, refining, developing, finishing, and the final roasting are performed. Alternately the roasting or milling and concomitant operations may be effected in a single stage, and if desired in a single mill but for flexibility of operation it may be desirable that a plurality of mills in two stages be employed. The completed chocolate liquor emerging from F is collected in a liquid reservoir G wherein a final separation of gases may be effected, and the finished liquor thence moulded into solid cakes or utilized directly while in the liquid state in preparing other chocolate products.

The terms "heat treat" and "heat treatment" appearing in the following claims are used generically to include all the various treating operations of chocolate material involving the application of heat, such as, refining, developing or finishing.

Having thus described my invention, I claim:

1. A process for preparing chocolate liquor from cacao nibs which comprises passing the cacao nibs between relatively rotating friction grinding surfaces to effect a grinding of the nibs and simultaneously evolving frictional heat, controlling the passage of the material through the grinding surfaces to thereby effect, developing and finishing of the material at least in part by means of contact with the evolved heat during passage of the material between the grinding surfaces, and finally subjecting the material thus treated to roasting and refining in the presence of said evolved heat.

2. A process for preparing chocolate from chocolate material which comprises milling the chocolate material and evolving heat, simultaneously with the evolution of heat, heat treating, developing and finishing the material with said evolved heat and thereafter roasting the heated milled material.

3. A continuous once-through process for preparing chocolate liquor from cacao nibs which comprises, passing the nibs between relatively rotating friction grinding surfaces to therein effect a grinding and heat treatment of the material and promptly thereafter subjecting the resulting heated liquid to roasting with an oxygen containing gas.

4. A process for preparing chocolate liquor from cacao nibs which comprises grinding the cacao nibs and evolving heat as the result of grinding friction, dispersing the resulting chocolate liquor in a thin film and employing said heat to effect an internal roasting of the film of chocolate liquor.

5. A process for preparing chocolate liquor from cacao nibs which comprises, grinding the cacao nibs in a grinding zone and evolving heat as the result of grinding friction, and heat treating the resulting liquor in the grinding zone with said evolved heat.

6. A process for preparing chocolate liquor from cacao nib material which comprises, grinding the material with gradually increasing fineness in a grinding zone and evolving heat from grinding friction, maintaining the material in the grinding zone to heat treat the material with said evolved heat, and thereafter roasting the resulting liquor.

7. A process for preparing chocolate liquor from cacao nibs which comprises, passing the cacao nibs between relatively rotating grinding surfaces to produce chocolate liquor and elevate the liquor at least to a roasting temperature by heat evolved from grinding friction, and passing the heated liquor from the grinding surfaces into an atmosphere of an oxygen containing gas to roast the liquor.

8. A continuous process for preparing chocolate liquor from cacao nib material which comprises, substantially drying the material, grinding the dried material in a grinding zone and evolving heat as the result of grinding friction, heat treating the material in the grinding zone with said evolved heat, withdrawing heat from the grinding zone and employing said withdrawn heat to dry the cacao nib material prior to grinding thereof.

9. In a process of preparing chocolate from chocolate material involving subjection of the material to heat treating and grinding, the improvement which comprises, grinding the material in a grinding zone and evolving heat as the result of grinding friction, and performing the heat treatment operation in the grinding zone by directly heating the material with said evolved heat.

10. A process for preparing chocolate from chocolate material which comprises, grinding the material in a grinding zone in the substantial absence of air and evolving heat as the result of grinding friction, and subjecting the material to heat treatment in the grinding zone with said evolved heat.

11. A process for preparing chocolate from chocolate material which comprises, grinding the material in a grinding zone and evolving heat as the result of grinding friction, subjecting the material to heat treatment in the grinding zone with said evolved heat, and passing the heated material from the grinding zone into an atmosphere of an oxygen containing gas to roast the material.

12. A process for preparing chocolate from chocolate material which comprises, grinding the material in a grinding zone and evolving heat as the result of grinding friction, cooling the grinding zone to maintain a predetermined amount of heat in said zone, and subjecting the material to heat treatment in the grinding zone with said predetermined amount of evolved heat.

13. A process for preparing chocolate from chocolate material which comprises, grinding the material in a grinding zone and evolving heat in excess of that required to heat treat the material as the result of grinding friction, maintaining a cooling medium in heat exchange relationship with said grinding zone to dissipate the excess portion of said evolved heat, subjecting the material to heat treatment in the grinding zone with the remaining evolved heat, and passing the material from the grinding zone into an atmosphere of a relatively cool oxygen containing gas to roast the material.

14. A process for preparing chocolate from chocolate material containing volatile substances which comprises, grinding the material in a grinding zone and evolving heat as the result of grinding friction, subjecting the material to heat treatment in the grinding zone with said evolved heat, roasting the ground and heated material, recovering the roasted chocolate, and separately recovering volatile substances vaporized as the result of heating and roasting.

15. A process for preparing chocolate from chocolate material which comprises, passing the material in a spiral course through a grinding zone and evolving heat as the result of grinding friction, and controlling said spiral course to maintain the material in said grinding zone for sufficient time to effect substantial heat treatment of the material with said evolved heat.

16. A process for preparing chocolate from chocolate material which comprises, grinding the material in a grinding zone and evolving heat as the result of grinding friction, subjecting the material to heat treatment in the grinding zone with said evolved heat, and passing the heated material from the grinding zone into an atmosphere of an alkalizing gas to effect alkalization of the material by absorption of said gas.

17. A process for preparing chocolate from chocolate material which comprises, grinding the material in a grinding zone in the substantial absence of air and evolving heat as the result of grinding friction, subjecting the material to heat treatment in the grinding zone with said evolved heat, and passing the heated material from the grinding zone into an atmosphere of a relatively cool inert gas whereby oxidation of the heated material is repressed by absorption of said inert gas.

ALBERT A. LUND.